(12) United States Patent
Haussecker et al.

(10) Patent No.: US 8,347,751 B2
(45) Date of Patent: Jan. 8, 2013

(54) TRANSMISSION DEVICE

(75) Inventors: Walter Haussecker, Buehlertal (DE); Max Fiedler, Buehlertal (DE); Volker Hertweck, Baden-Baden (DE); Franz Tasch, Rheinstetten (DE); Peter Bohr, Karlsruhe (DE); Holger Thoene, Rastatt (DE); Dieter Depner, Sinzheim (DE)

(73) Assignee: Robert Bosch GmbH, Stuttgart (DE)

( * ) Notice: Subject to any disclaimer, the term of this patent is extended or adjusted under 35 U.S.C. 154(b) by 660 days.

(21) Appl. No.: 12/439,998

(22) PCT Filed: Aug. 14, 2007

(86) PCT No.: PCT/EP2007/058389

§ 371 (c)(1),
(2), (4) Date: Dec. 7, 2009

(87) PCT Pub. No.: WO2008/028765

PCT Pub. Date: Mar. 13, 2008

(65) Prior Publication Data

US 2011/0036189 A1    Feb. 17, 2011

(30) Foreign Application Priority Data

Sep. 8, 2006 (DE) .......................... 10 2006 042 341

(51) Int. Cl.
*F16D 3/58* (2006.01)
*F16D 3/62* (2006.01)
*F16H 55/14* (2006.01)

(52) U.S. Cl. ................ 74/411; 74/409; 74/440

(58) Field of Classification Search .............. 74/411, 74/443, 572.2, 573.12, 574.4, 409, 440, 406; 464/69, 71–73, 81–83, 85, 160

See application file for complete search history.

(56) References Cited

U.S. PATENT DOCUMENTS

| | | | | | |
|---|---|---|---|---|---|
| 377,661 | A | * | 2/1888 | Batty | 403/261 |
| 480,439 | A | * | 8/1892 | Seaton | 464/66.1 |
| 1,437,949 | A | * | 12/1922 | Sherman et al. | 226/134 |
| 1,451,818 | A | * | 4/1923 | Forster | 74/574.4 |
| 1,669,931 | A | * | 5/1928 | Dowrie | 464/102 |
| 1,679,992 | A | * | 8/1928 | Short | 464/73 |
| 1,965,024 | A | * | 7/1934 | Allen | 464/82 |
| 2,003,848 | A | * | 6/1935 | Grundy | 464/73 |
| 2,025,829 | A | * | 12/1935 | Ricefield | 464/73 |
| 2,060,565 | A | * | 11/1936 | Geyer | 74/574.4 |
| 2,102,167 | A | * | 12/1937 | Rotter | 74/411 |
| 2,159,235 | A | * | 5/1939 | Tyler et al. | 74/574.4 |
| 2,300,778 | A | * | 11/1942 | Cornwell | 310/103 |
| 2,716,334 | A | * | 8/1955 | Scott et al. | 464/73 |
| 2,859,637 | A | * | 11/1958 | Hagenlocher | 74/574.4 |
| 2,893,717 | A | * | 7/1959 | Simmons | 267/161 |
| 3,236,066 | A | | 2/1966 | Webb | |

(Continued)

FOREIGN PATENT DOCUMENTS

CH          108771          3/1925

(Continued)

*Primary Examiner* — William C Joyce
*Assistant Examiner* — Terence Boes
(74) *Attorney, Agent, or Firm* — Merchant & Gould P.C.

(57) ABSTRACT

The invention relates to a transmission device comprising a first gear wheel and a second gear wheel that is rotatably coupled thereto, wherein a damping element acting in the circumferential direction is provided axially between the gear wheels. According to the invention it is provided that the damping element can be tensioned by the gear wheels during the operation of the transmission device.

8 Claims, 2 Drawing Sheets

U.S. PATENT DOCUMENTS

| | | | | |
|---|---|---|---|---|
| 3,293,883 A | * | 12/1966 | Boschi et al. | 464/74 |
| 3,425,528 A | * | 2/1969 | Perruca | 464/23 |
| 3,427,827 A | * | 2/1969 | Airheart | 464/74 |
| 3,475,923 A | * | 11/1969 | Spence | 464/76 |
| 3,540,233 A | * | 11/1970 | Pearson | 464/74 |
| 3,550,395 A | * | 12/1970 | Herzog et al. | 464/81 |
| 3,662,568 A | * | 5/1972 | Kashima et al. | 464/93 |
| 3,685,722 A | * | 8/1972 | Nichols, Jr. | 494/53 |
| 4,019,345 A | * | 4/1977 | Fukuda | 464/69 |
| 4,437,847 A | * | 3/1984 | Calistrat | 464/74 |
| 4,543,075 A | * | 9/1985 | Colford | 464/76 |
| 4,557,703 A | * | 12/1985 | Rivin | 464/73 |
| 4,613,316 A | * | 9/1986 | Reynolds | 464/85 |
| 4,678,452 A | * | 7/1987 | Nelson et al. | 464/38 |
| 5,178,026 A | * | 1/1993 | Matsumoto | 74/411 |
| 5,214,975 A | | 6/1993 | Zalewski | |
| 5,668,425 A | * | 9/1997 | Marioni et al. | 310/162 |
| 5,709,605 A | * | 1/1998 | Riefe et al. | 464/83 |
| 5,725,449 A | | 3/1998 | Park | |
| 6,547,053 B2 | * | 4/2003 | Shih | 192/55.61 |
| 6,993,996 B2 | * | 2/2006 | Herrmann | 74/574.3 |
| 7,867,096 B2 | * | 1/2011 | Stamps et al. | 464/50 |
| 2002/0139630 A1 | * | 10/2002 | Shih | 192/55.61 |
| 2003/0050122 A1 | * | 3/2003 | Yorston et al. | 464/73 |
| 2004/0082390 A1 | | 4/2004 | Nosaka et al. | |
| 2008/0034918 A1 | * | 2/2008 | Manzoor et al. | 74/574.4 |
| 2009/0078079 A1 | * | 3/2009 | Manzoor et al. | 74/574.4 |

FOREIGN PATENT DOCUMENTS

| | | |
|---|---|---|
| DE | 2 533 477 | 2/1977 |
| DE | 198 40 036 | 5/1999 |
| DE | 102 46 711 | 4/2004 |
| DE | 10 2004 006 602 | 9/2005 |
| DE | 10 2006 014 763 | 10/2007 |
| EP | 0 761 271 | 3/1997 |
| EP | 1 577 587 | 9/2005 |

* cited by examiner

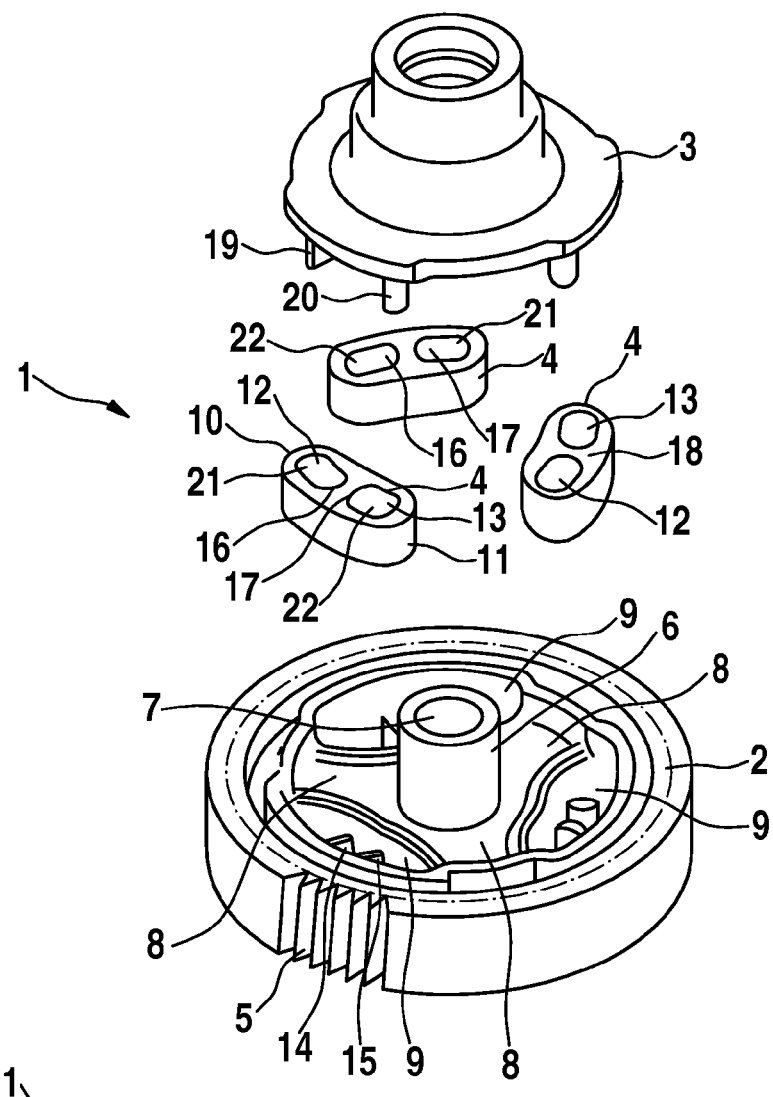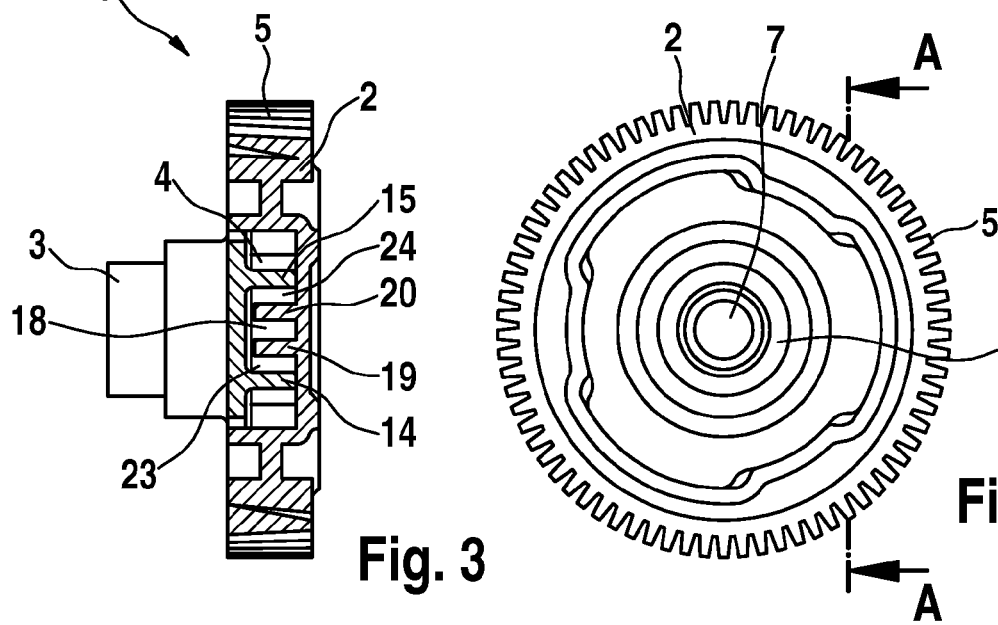

TRANSMISSION DEVICE

TECHNICAL FIELD

The invention concerns a transmission device according to the generic term of claim 1.

BACKGROUND

Such transmission devices are particularly used for adjusting devices in motor vehicles like power windows or sunroofs, which are operated by an electromotor. Hereby an electromotor is used, which especially adjusts for example the window between an opening- and a closing-adjustment by a transmission. Since oscillations and/or undesired shock loads can occur at the operation when warming up the electromotor or when bumping at an end position, it is known to arrange damping elements between two axially adjacent gear wheels. Such a transmission device is described as state of the art in DE 102 46 711 A1. At the familiar transmission device a force is transferred from a spur gear in circumferential direction to a driving wheel by the damping elements. When bumping at an end position or at shock loads the damping elements are clinched in circumferential direction, whereby they expand in axial direction. As a result of this the two gear wheels are pressed apart, which causes a high mechanical load for the components, in particular the bearings.

A gear wheel is known from the unpublished DE 10 2006 014 763, which consist of a hub shell and a radial spaced cogwheel body, which are connected with each other by a deformable damping element. The damping element is stressed with torsion at the operation of the cogwheel. Furthermore it is known from the script to attach a second cogwheel body that is axially spaced to the first cogwheel body at the hub shell by a damping element, whereby the second cogwheel body is also arranged radial spaced to the hub shell. Even the damping element that connects the second cogwheel body with the hub shell is loaded with torsion during the operation of the cogwheel.

SUMMARY

The invention is based on the task to propose a transmission device with two axially parallel arranged gear wheels, in between which a damping element is arranged, whereby it is avoided that the gear wheels are axially pressed apart in the damping case.

This task is solved by the characteristics of claim 1.

The invention is based on the idea to arrange the at least one damping element in such a way that it is not pressure-loaded at the operation of the transmission device (expulsion device), but, preferably exclusively, in circumferential direction tension-loaded. As a result of this the damping element is not clinched and can therefore not expand in axial direction. The damping element is stretched at the tension-load and thereby even narrowed in axial direction. Compared to the state of the art no force occurs in axial direction, which endeavors to press the two gear wheels apart. The mechanical load of the gear wheels as well as of their bearings is hereby reduced. Preferably the damping elements are also not torsion-loaded, which significantly increases their operational life span.

As an improvement of the invention not only one damping element is provided, but several, preferably three damping elements that are arranged axially spaced from each other in circumferential direction between the gear wheels. In order to ensure an equal force distribution it is advantageously provided as an embodiment of the invention that the damping elements are arranged equally distributed in circumferential direction.

In order to allow a torque transmission between the two gear wheels, and in order to tension-load thereby the at least one damping element, it is provided according to an improvement of the invention that both gear wheels are solidly connected in axial direction with the damping element, so that forces can be transferred in circumferential direction. Therefore the solid connection or the sections that create the solid connection has not to be inevitably form-congruent, which would yet be advantageously.

A possibility for realizing a form fit, which enables a force transmission in circumferential direction, is to provide at least one extension that is pointing in axial direction at the at least one gear wheel, preferably at both gear wheels, which meshes into a corresponding opening in the damping element. If one of the gear wheels is driven, the extension abuts at an inner wall of the opening and transfers thereby a force onto the damping element, which on the other hand transfers a force in circumferential direction onto the axially space gear wheel.

Preferably both gear wheels each provided at least one axial extension, whereby the two extensions preferably mesh into a common corresponding opening, especially an axial through opening of the damping element. It is furthermore conceivable that the extensions of the spaced gear wheels mesh in openings that are spaced in circumferential direction, preferably through openings of the damping elements.

Preferably rubber- and/or plastic elements are used as damping elements.

According to a preferred embodiment it is provided that the damping element has two spaced through openings in circumferential direction. Each gear wheel meshes with an extension into each opening. The extensions of one gear wheel embrace thereby preferably the extensions of the other gear wheel, whereby one radial slot is provided between two extensions within one through opening. If one of the gear wheels is rotated, the damping element is stretched in circumferential direction and a torque is transferred over the damping element to the axially opposing gear wheel. If a damping element should snatch or be overstretched, it is provided due to the clinching arrangement of the extensions that the rotation, even if un-damped, does not end, but that the forces between the gear wheels can still be transferred, since the extensions that are adjacent in one of the openings get together in that case and ensure an un-damped force transmission.

Additionally or alternatively to an axial extension at the at least one gear wheel, which meshes in a corresponding opening of the damping element, an axial extension can be provided at the damping element, preferably made of non-damping material, which meshes in a corresponding opening of at least one gear wheels. Preferably axial extensions are provided at both opposing sides of the damping element in axial direction, with which the damping element meshes in corresponding openings in both gear wheels.

Preferably one of the gear wheels is arranged as a spur gear with an external tooth system and the axially spaced gear wheel as a driving wheel. Such established transmission devices qualify especially for the use in adjustment units in motor vehicles. The driving wheel preferably provides an external tooth system or other form fir means, on to which for example a hoisting drum can be plugged-on. It is a further advantage, if the driving wheel can be plugged-on the spur gear in axial direction, whereby the damping element is incorporated between the two gear wheels during this plug-on process.

Preferably the damping elements are separate components, thus not a mass that sticks the gear wheels together. Therefore they can be disassembled, thus exchanged, without destroying thereby the transmission device. Advantageously the damping elements are incorporated in the pockets of at least one gear wheel, whereby two pockets that are adjacent in circumferential direction are separated from each other by at least one radial shoulder.

BRIEF DESCRIPTION OF THE DRAWINGS

Further advantages and practical embodiments of the invention are explained in further claims, the figure description and the drawing.

It is shown in:

FIG. 1 shows an explosion illustration of a transmission device, comprising two gear wheels and three damping elements spaced in circumferential direction, FIG. 2 is a front view of a mounted transmission device, FIG. 3 is a cross-sectional view along the cutting line A-A according FIG. 2.

DETAILED DESCRIPTION

Figure 4:
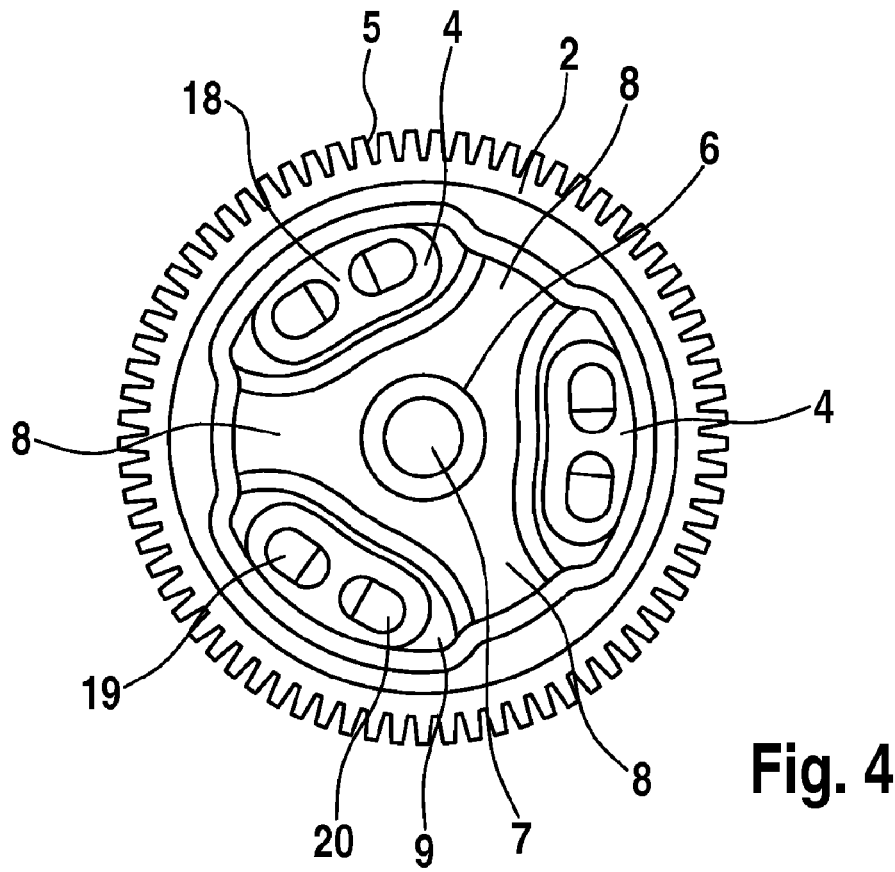
FIG. 4 is a top view on to a gear wheel with three damping elements without an installed second gear wheel.
Figure 5:
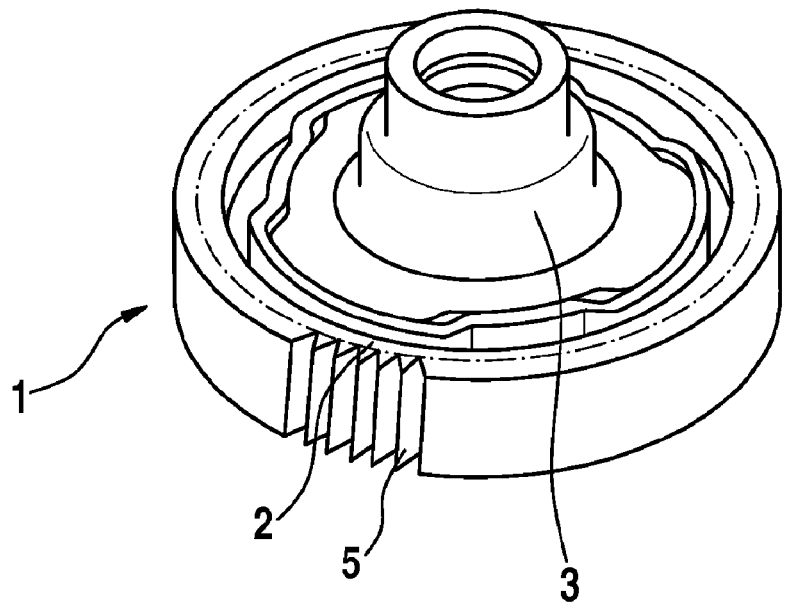
FIG. 5 is a perspective view of a mounted transmission device.

Identical components and components with identical functions are labeled with identical reference signs in the figures.

The transmission device 1 that is shown in FIG. 1 comprises a first gear wheel 2 that is arranged as spur gear and a second gear wheel 3 that is axially adjacent and arranged as driving wheel. Three damping elements 4, shifted by 120° in circumferential direction, are provided between the first gear wheel 2 and the second gear wheel 3. The damping elements 4 serve for damping in circumferential direction as well as for torque transmission between the two gear wheels 2, 3. At the operation of the transmission device the damping elements 4 are exclusively tension-loaded by the gear wheels 2, 3 in circumferential direction.

The gear wheel 2 that is arranged as spur wheel is provided with an external tooth system as well as with an inner wheel hub 6 that is arranged coaxially to it with a centric hole 7 for bearing the transmission device 1 on a not shown bearing bolt. Between the wheel hub 6 and the external tooth system 5 three radial shoulders 8, which are adjacent in circumferential direction and which create three pockets 9 for the damping elements 4 that are adjacent to each other in circumferential direction (compare especially FIG. 4), spread out in radial direction.

Each damping element 4 is slightly crooked and provides rounded ends 10, 11 that point in circumferential direction. Within each damping element 4 there are two longish openings 12, 13 that are arranged as through opening adjacent in circumferential direction. Each opening 12, 13 incorporated an axial extension 14, 15 of the first gear wheel 2, whereby the two axial extensions 14, 15 of the first gear wheel 2 abut at the adjacent inner areas 16, 17 of the openings 12, 13 facing each other. The two axial extensions 14, 15 are separated from each other by a radial shoulder 18 of the damping element 4. In addition to an axial extension 14, 15 of the first gear wheel 2 there is an axial extension 19, 20 of the second gear wheel 3 incorporated in each opening 12, 13 of the damping element 4. These extensions 19, 20 are arranged in the outer areas 21, 22 of the openings 12, 13 that are pointing away from each other in circumferential direction, whereby, as it can be seen in FIG. 3, a radial slot 23, 24 is created between the two adjacent axial extensions 14, 19 and 15, 20 within each opening 12, 13, which allows a stretching in circumferential direction of the damping element 4 independent of the direction of rotation. If an overstretching of the damping element 4 or even a snatching of an opening 12, 13 occur, the clinching arrangement of the axial extensions 19, 20; 14, 15 ensures that depending on the direction of rotation either the axial extensions 14, 19 or 15, 20 abut at each other and therefore a provide a continuing rotation of the transmission device 1.

It is also conceivable that for example only the axial extension 19 meshes into the opening 12 and only the axial extension 15 of the spur gear meshes into the opening 13. Even in that case a load in the damping element 4 in circumferential direction would be given, but only at a rotation in a clockwise direction (FIG. 1). Due to the arrangement of the extensions 14, 15, 19, 20 that is shown in FIGS. 1 to 5, the damping elements 4 is exclusively tension-loaded independent of the direction of rotation of the transmission device, which is especially advantageous for the use in adjustment units due to the continuously changing direction of rotation.

The damping elements are exclusively tension-loaded in the shown embodiments. A pressure-load as well as a torsion-load are advantageously excluded.

The invention claimed is:

1. A transmission device comprising:
 a first gear wheel;
 a second gear wheel hub, wherein the first gear wheel and second gear hub are rotatably coupled; and
 a damping element, wherein the damping element is circumferentially arranged and positioned axially between the first gear wheel and second gear wheel hub, and wherein the damping element can be tensioned by the first gear wheel and second gear wheel hub during operation of the transmission device; wherein the damping element comprises a plurality of damping elements, wherein the damping elements are equally circumferentially distributed; and wherein the damping elements comprise through holes, and wherein both the first gear wheel and second gear wheel hub are configured to include at least one axial extension, and wherein the at least one axial extension of the first gear wheel and second gear wheel hub mesh axially into a common corresponding opening of the damping elements.

2. The transmission device of claim 1, wherein the damping element can be tensioned in both a first and second direction of rotation.

3. The transmission device of claim 1, wherein the first gear wheel and second gear wheel hub are each connected in an axial direction with the damping element.

4. The transmission device of claim 1, wherein at least one of the first gear wheel and second gear wheel hub are configured to include at least one extension aligned in an axial direction, wherein the at least one extension meshes into a corresponding opening in the damping element.

5. The transmission device of claim 1, wherein the damping element is configured to include a first and second opening distanced circumferentially, and wherein the first gear wheel and second gear wheel hub are configured with a first and second axial extension that mesh into the first and second opening of the damping element, wherein a radial slot is provided between the first and second axial extension when meshed in the first and second opening, and wherein the first and second axial extensions of the first gear wheel are arranged in a first and second outer area of the first and second openings that are pointed away from each other in a circumferential direction, and wherein the first and second axial extensions of the second gear wheel hub are arranged in a first and second inner area of the first and second openings that are adjoining in the circumferential direction.

6. The transmission device of claim 1, wherein the damping element is configured to provide at least one extension, wherein the at least one extension points in an axial direction and meshes in a corresponding opening of one of the first gear wheel and second gear wheel hub.

7. The transmission device of claim 1, wherein the first gear wheel is arranged as a spur wheel with an external tooth system.

8. The transmission device of claim 1, wherein the damping element is arranged as an independent, removable component.

\* \* \* \* \*